US006419476B1

(12) United States Patent
Ouellette

(10) Patent No.: US 6,419,476 B1
(45) Date of Patent: Jul. 16, 2002

(54) THERMALLY INSULATED RUNNER MANIFOLD AND INJECTION NOZZLE CONSTRUCTION FOR PLASTIC MOLDING APPARATUS

(76) Inventor: Joseph P. Ouellette, 529 Lakewood Dr., R.R. #2, Amherstburg, Ontario (CA), N9V 2Y8

( * ) Notice: Subject to any disclaimer, the term of this patent is extended or adjusted under 35 U.S.C. 154(b) by 0 days.

(21) Appl. No.: 09/374,970

(22) Filed: Aug. 16, 1999

Related U.S. Application Data

(60) Provisional application No. 60/097,779, filed on Aug. 25, 1998.

(51) Int. Cl.[7] ............................ B29C 45/18; B29C 45/27
(52) U.S. Cl. ............. 425/567; 425/570; 425/DIG. 227; 425/DIG. 229
(58) Field of Search ................................. 425/549, 547, 425/569, 570, 568, DIG. 224, DIG. 227, DIG. 229, 567

(56) References Cited

U.S. PATENT DOCUMENTS

| 3,580,286 A | 5/1971 | Bash |
| 3,596,804 A | 8/1971 | Barrow et al. |
| 3,698,640 A | 10/1972 | Stanciu |
| 3,797,086 A | 3/1974 | Asselman |
| 3,797,984 A | 3/1974 | Yago et al. |
| 3,819,312 A | 6/1974 | Arpajian |
| 3,945,353 A | 3/1976 | Dreisin |
| 4,034,952 A | 7/1977 | Stewart |
| 4,059,375 A | 11/1977 | Koch et al. |
| 4,116,266 A | 9/1978 | Sawata et al. |
| 4,121,740 A | 10/1978 | Gabrys |
| 4,125,352 A | 11/1978 | Gellert |
| 4,170,262 A | 10/1979 | Marcus et al. |
| 4,196,855 A | 4/1980 | Osuna-Diaz |
| 4,212,627 A | 7/1980 | Gellert |
| 4,260,359 A | 4/1981 | Dannels et al. |
| 4,273,525 A | 6/1981 | Reitan |
| 4,299,791 A | 11/1981 | Aoki |
| 4,389,002 A | 6/1983 | Devellian et al. |
| 4,416,608 A | 11/1983 | Deardurff |
| 4,497,621 A | 2/1985 | Kudert et al. |
| 4,500,279 A | 2/1985 | Devellian et al. |

(List continued on next page.)

OTHER PUBLICATIONS

Injection Molding Handbook, Rosato et al. , 1995, International Thomson Publishing Company, second edition, pp. 223 and 251.*
Mold–Making Handbook, Mennig, 1998, Hanser Publishers, second edition, pp. 24, 24 and 517.*

Primary Examiner—Robert Davis
Assistant Examiner—Emmanuel Luk
(74) Attorney, Agent, or Firm—Reising, Ethington, Barnes, Kisselle, Learman & McCulloch, P.C.

(57) ABSTRACT

An improved injection molding runnerless manifold and nozzle system, method and apparatus in which the fluid plastic molding material transfer conduits, such as the manifold runner channels and cavity injection nozzle passageway, are constructed of a low thermal conductivity, non-metallic heat insulation structural material to thereby heat insulate the liquified molding material or resin, whether thermosetting or thermoplastic, while resident in the manifold runners and/or nozzle passageways. The heat transfer and other physical parameters of the conduit material and structure are such that this molding material remains at a reasonable uncured molding temperature while resident in the transfer conduit for the duration of at least one injection cycle due to the heat insulation characteristics of these fluid flow conduits of the system. Preferably the heat insulation material of which the flow conduits are constructed is a polymer material having mechanical properties adequate to permit continuous accessible usage in the foregoing method as part of a separable and clampable manifold and/or nozzle system within the mold tooling as operable in the injection molding environment.

23 Claims, 6 Drawing Sheets

U.S. PATENT DOCUMENTS

| | | | |
|---|---|---|---|
| 4,609,341 A | * 9/1986 | Muller | 425/547 |
| 4,664,151 A | 5/1987 | Piet | |
| 4,666,396 A | 5/1987 | Shaw | |
| 4,689,002 A | 8/1987 | Sorine | |
| 4,708,633 A | 11/1987 | Hayashi et al. | |
| 4,768,559 A | 9/1988 | Hehl | |
| 4,771,164 A | 9/1988 | Gellert | |
| 4,826,416 A | 5/1989 | Majerus et al. | |
| 4,923,387 A | 5/1990 | Gellert | |
| 4,954,072 A | 9/1990 | Zimmerman | |
| 4,980,111 A | 12/1990 | Majerus | |
| 5,002,480 A | 3/1991 | Gellert et al. | |
| 5,017,127 A | 5/1991 | Majerus et al. | |
| 5,028,227 A | 7/1991 | Gellert et al. | |
| 5,051,086 A | 9/1991 | Gellert | |
| 5,162,125 A | 11/1992 | Akselrud et al. | |
| 5,200,208 A | 4/1993 | Cohen et al. | |
| 5,232,711 A | 8/1993 | Hendry | |
| 5,328,352 A | 7/1994 | Pierce | |
| 5,374,178 A | 12/1994 | Nakayama | |
| 5,411,392 A | 5/1995 | Von Buren | |
| 5,427,519 A | 6/1995 | Gellert | |
| 5,492,467 A | 2/1996 | Hume et al. | |
| 5,545,028 A | 8/1996 | Hume et al. | |
| 5,554,395 A | 9/1996 | Hume et al. | |
| 5,607,992 A | 3/1997 | Chiba et al. | |
| 5,639,490 A | 6/1997 | Travaglini | |
| 5,645,219 A | 7/1997 | Miks et al. | |
| 5,652,003 A | 7/1997 | Gellert | |
| 5,658,604 A | 8/1997 | Gellert et al. | |
| 5,674,439 A | 10/1997 | Hume et al. | |
| 5,695,793 A | 12/1997 | Bauer | |
| 5,704,113 A | 1/1998 | Mak | |
| 5,705,202 A | 1/1998 | Gellert | |
| 5,707,664 A | 1/1998 | Mak | |
| 5,716,651 A | 2/1998 | McGrevy | |

* cited by examiner

THERMALLY INSULATED RUNNER MANIFOLD AND INJECTION NOZZLE CONSTRUCTION FOR PLASTIC MOLDING APPARATUS

This is a regular United States utility patent application filed pursuant to 35 USC§111(a) and claiming the benefit under the provisions of 35 USC§119(e) (1) of the priority of United States provisional patent application Ser. No. 60/097,779 filed Aug. 25, 1998.

FIELD OF THE INVENTION

This invention relates generally to pressurized fluid distribution systems, and more particularly to thermally insulated runner manifold systems and associated mold cavity injection nozzles for injection molding of plastic materials.

BACKGROUND OF THE INVENTION

Apparatus for molding of plastics, particularly injection molding, comprises dies mounted on die blocks, which blocks in turn are mounted on the platens of a press. Molten or plasticized material is forced by pressure out of a nozzle of a molding machine injection ram and through a mold tooling sprue bushing or the like which serves to transmit or conduct the plasticized material from the ram nozzle to the runners provided in a manifold plate. The plasticized material is then fed via runner outlet nozzles to the various individually associated mold cavities in the die blocks. These cavities are maintained at a temperature appropriate to cause solidification of the plastic formed in the die, a substantially different temperature than that of the manifold plate. In the case of thermoplastics, such mold cavities are maintained at a reduced temperature sufficient to cause solidification of the liquified thermoplastic material filling the cavity. In the case of a thermoset compound the die blocks are heated to an appropriate temperature to cause curing or "setting" of the plasticized material or compound in the die cavity after likewise being injection filled with such material in a liquid state. "Runnerless" manifold systems are widely used in the construction of such injection molds for producing plastics and rubber parts. These manifold systems provide a method for accepting the molding material from the injection ram of the injection molding machine and distributing this material into multiple cavities or to multiple locations within the mold to produce either multiple parts simultaneously or to fill a large part mold cavity from multiple locations. In all instances, the manifold system is designed in such a way as to permit the molding material within the manifold runner passageway system to remain in its fluid plastic or uncured state such that the material remaining resident in the manifold system may be used in the next molding cycle. In this way there is no need for wastefully leaving a solid runner attached to the molded part upon demolding. For that reason, these systems are often referred to as "runnerless" molding systems. In the context of thermoplastic molding such a system also is referred to as a "Hot Runner System". When used in the context of thermoset plastic or rubber molding, such a system is referred to as a "Cold Runner System."

This injection molding apparatus and technology of the prior art is described hereinafter in order to highlight the difficulty associated with heating or cooling of the plastic material while it is resident in the runner channels in order to maintain the fluidity of the resident plastic material during the period of closure of the injection gate in the injection cycle thereby enabling its use in the following molding cycle.

For example, as illustrated in FIGS. 1, 2, 3, 4 and 4A, a "cold runner manifold system" is part of an injection mold assembly 20 used for the production of a rubber molded part 22. Such a cold runner system is made up of a piping or channel manifold plate 24 containing multiple channels, or "runners" 26, providing multiple flow exits through which uncured liquid rubber material flows upon being pressurefed from the outlet nozzle of an injection molding machine ram into a single manifold entrance point 28 (FIG. 1). Mold-cavity-injection nozzles 30 (FIGS. 3, 4 and 4A) are threaded into the manifold plate 24, one at each channel or runner exit.

During the injection portion of the molding cycle, these distribution channels or runners distribute the uncured rubber evenly within the mold to a number of molding cavities 32 that are configured to produce molded rubber parts 22. The manifold distribution system fills the cavities 22 of the mold 20 simultaneously under controlled pressure supplied by the injection molding machine injection ram. The temperature of this uncured rubber is held generally in the range of 50° C. while resident in the manifold distribution system. However, the cavity steel (upper and lower cavity plates 34 and 36, FIGS. 4 and 4a) of the mold is maintained at a much higher and constant cure temperature, typically within a general processing range of 160° C. As the mold cavities 32 are filled, the curing process begins. The system is thus referred to as a "cold runner system" because the system exists within a mold that is operating at a steel temperature in the realm of 160° C. while the manifold plate 24 and the rubber molding material within it is operating at a temperature in the realm of 50° C. The manifold plate runner system thus requires water cooling to maintain its lower temperature because the manifold plate runner system must operate in close proximity to, but at a significantly lower temperature than, the rest of the heated mold components (i.e., mold steel. In such a prior art system, referred to as a "cold runner system", such cooling is provided by water channels 38 that extend roughly parallel to, or are in proximity to, the manifold rubber flow passages or runners 26.

In all instances these manifold systems require nozzles 30 at the cavity end of the runner channels 26 to facilitate, control and direct the flow of the molding material into the associated part cavities 32. These prior art nozzles 30 are conventionally formed from steel or some other high strength alloy that is highly heat conductive, and are threaded or otherwise affixed to the manifold plate 24 to bear upon mold closure on the back of the upper cavity plate 34, thereby providing a direct channel for the molding material to flow into the individual cavities 32. The nozzles are typically of either a conventional "flow through" or "valve gate" design.

Thus it will be seen that nozzles 30 used in these prior art manifold systems are located at the junction between the manifold system plate 24 and the part cavities 32 of the upper cavity plate 34 of the mold or tool 20. This location is a site where a significant temperature gradient differential occurs, i.e., as indicated above the manifold plate 24 is typically at a temperature that is 70° C. to 80° C. different from the cavity plates 34 and 36 which hold or form the molded part cavities 32.

Each nozzle 30 if not externally augmented in some way, will be influenced by temperature from the mold steel defining the part mold cavities and ultimately will achieve a temperature that will permit the fluid molding material resident in the nozzle to cure or solidify before that material is injected into the part cavities. In order to prevent this from happening, the nozzles are either heated or cooled, depending upon whether the type of injection molding application in which they are used is molding from thermoplastic or thermosetting plastic materials.

For thermoplastics molding applications, nozzles 30 are conventionally heated to roughly the same degree as the manifold system to insure that the material in the nozzle does not solidify during the cure or cooling cycle when the material in the part cavities 32 is cooled to provide the solidification necessary to produce a molded part 22. When applied to thermoset plastics or rubber molding, the nozzles 30 are cooled to roughly the same temperature as the manifold system to insure that the semi-liquid or uncured material resident in each nozzle remains in the uncured state during the mold heating or curing phase of the molding cycle when the molding material resident in the mold cavities 32 is being heat cured to provide the solidification necessary to produce a molded part 22.

Such heating or cooling of nozzles is necessary in prior art systems due to the thermal conductivity of the materials used in the construction of the prior art nozzles and the contact of each nozzle with the cavity blocks of the mold which are at significant differential temperatures with respect to the manifold. This nozzle heating takes the form of either attaching electric heaters to the O.D. of the nozzle body or installing electric heaters inside the body. As an alternative, hot oil can be circulated through the nozzle body. When nozzle cooling is required, the nozzle can be jacketed and thereby infiltrated by water channels 46 (FIG. 4A), or an array of heat pipes can be installed in the nozzle body to transfer the heat to the cold manifold plate 24 which acts as a heat sink. In both instances the complexity of the nozzle temperature augmentation system introduces unwanted equipment and maintenance costs into the system, and does not permit the use of small diameter nozzles due to space constraints.

The manifold and the nozzles described in conjunction with FIGS. 1–4A thus constitute the current design and prior art technology for a cold or hot runner manifold or system. The present method for producing these "cold runner manifold systems" is to bore the runner channels 26 into the steel manifold plate 24 to provide the rubber flow distribution passageways. The cooling water channels 38 are bored into the same plate 24 in locations roughly parallel to the rubber flow runner channels 26. All the rubber flow runner channels 26 are connected to the single sprue inlet 28 on the top face of the manifold plate 24. The multiple runner channels all exit the bottom face 40 of the manifold plate 24 in locations that correspond to the locations of the associated molding cavities 32. A nozzle 30 is threadably attached to each of the outlets of these runner channels to individually connect the same with the associated mold cavities 32. The manifold plate 24 is insulated thermally from the heated mold cavities by an insulation plate 42 that provides a thickness of insulation that has sufficient compressive strength and temperature stability to remain dimensionally stable at the elevated temperatures at which the mold operates (FIGS. 3 and 4).

The nozzles 30 (also referred to as bushings) are removably attached to the manifold plate 24, usually by threading them directly into the plate. These nozzles are installed such that they protrude through the insulation plate 42. The flat end tips 44 of the nozzles 30 bear on a mating flat portion of upper cavity plate 34 defining the margin of the associated cavity filling passageway in plate 34 such that uncured rubber exiting from each nozzle 30 is fed directly into the associated mold cavity 32 (FIG. 4).

As noted previously, it is necessary to cool these nozzles 30 because of the metal-to-metal contact between the nozzle tip 44, the curing rubber and the upper cavity plate or steel 34. The cavity plate or steel 34 and the curing rubber are operating at temperatures in the range of 160° C., while the uncured rubber residing in nozzle 30 must be maintained at 60° C. to prevent pre-cure ("setting") while the rubber is in the nozzle 30. The rubber residing in the manifold plate 24 is forced out of the manifold runners 26 and nozzles 30 and into the cavities 32 under the pressure generated by the injection barrel screw or piston of the molding machine. Thus, as the rubber in the cavities 32 is being cured, the rubber in residence in the nozzle 30, waiting for the next injection and cure cycle, is being adversely heated by thermal energy conducted from the upper cavity plate or steel 34 through that part of the nozzle (tip 44) that is in contact with the cavity steel 34. As illustrated by the modified nozzle 30' of FIG. 4A, the present method for cooling these nozzles and maintaining a pre-cure temperature level for the uncured rubber resident in these nozzles is to have cooling water flow through a series of water cooling jacket channels 46 machined or cast into the nozzle body.

OBJECTS OF THE INVENTION

Accordingly, among the objects of the present invention are to provide a new and improved system, method and apparatus for providing fluid transfer in both thermoplastic and thermoset injection molding applications as well as in any application where manifolds and/or associated nozzles are required to provide accurate distribution of pressurized fluids, particularly liquids or semi-solid materials, that overcomes and/or alleviates the foregoing problems of the prior art, and wherein significant improvements are obtained in terms of simplification, ease of construction, ease of cleaning and balanced molding pressure as it applies to the flow of the liquid molding material through a manifold and into an associated multiplicity of cavities fed by the manifold system.

Another object of the present invention is to provide an improved mold cavity injection nozzle for use in such a system, method and apparatus that does not require the introduction of heating or cooling means to offset the effects of contact of the nozzle with a mold steel or material defining the part cavities in the mold, that in certain embodiments can be used with highly abrasive molding materials containing high loadings of glass, carbon or mineral fibers or grains, and that in one of the novel embodiment incorporates a stemless valve gate mechanism such that fluid injection pressure will cause its downstream orifice to open for the duration of the injection or fill phase of the molding cycle, and when the injection or fill phase is completed and the injection pressure ceases, the orifice will be self closing to thereby stop the flow of uncured rubber and allow the rubber in the mold cavity to cure, thereby resulting in the cured part exhibiting little or no sprue vestige.

SUMMARY OF THE INVENTION

In general, and by way of summary description and not by way of limitation, the invention achieves the foregoing as well as other objects indicated hereinafter by providing an injection mold manifold and nozzle system in which the fluid transfer components, such as the manifold runner channels and cavity injection nozzle, are constructed of a low thermal conductivity, non-metallic heat insulation material to thereby heat insulate the molding material or resin resident in the runners and/or nozzle so that this material remains at a reasonable uncured molding temperature for the duration of at least one injection cycle due to the heat insulation characteristics of these fluid flow channels of the system. Preferably the heat insulation material of which the flow channels are constructed is a polymer material having mechanical properties adequate to permit continuous accessible usage as part of the manifold and/or nozzle system within the mold in the molding environment.

BRIEF DESCRIPTION OF THE DRAWINGS

The foregoing, as well as other objects, features and advantages of the present invention will become apparent from the following detailed description of the best mode presently known by the inventor for making and using the invention, from the appended claims and from the accompanying drawings wherein:

DETAILED DESCRIPTION OF THE PREFERRED EMBODIMENTS OF THE INVENTION

Figure 1:
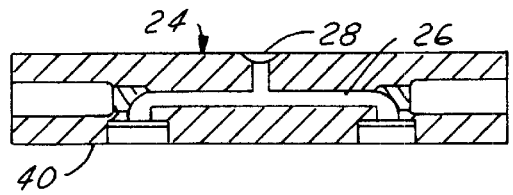
FIG. 1 is a cross sectional view taken on the line 1—1 of FIG. 2 illustrating a conventional manifold plate for a four cavity mold. of the injection molding tooling assembly of FIG. 4.
Figure 2:
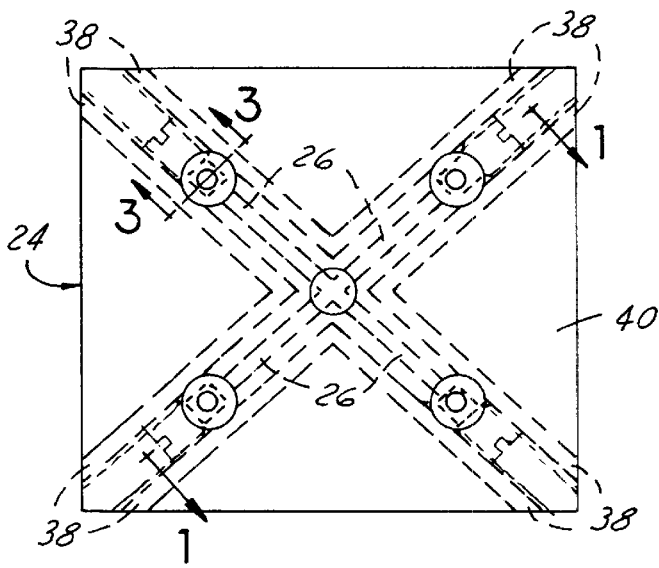
FIG. 2 is a bottom plan view of the manifold plate of FIG. 1.
Figure 3:
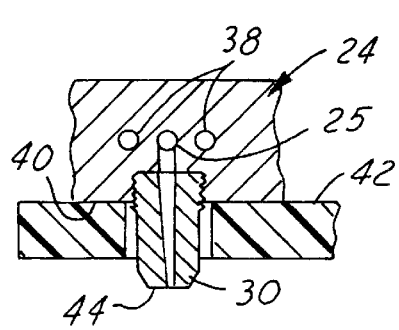
FIG. 3 is a fragmentary cross sectional view of the manifold plate, insulation plate and nozzle of the conventional prior art mold assembly of FIG. 4 and slightly enlarged thereover.
Figure 4:
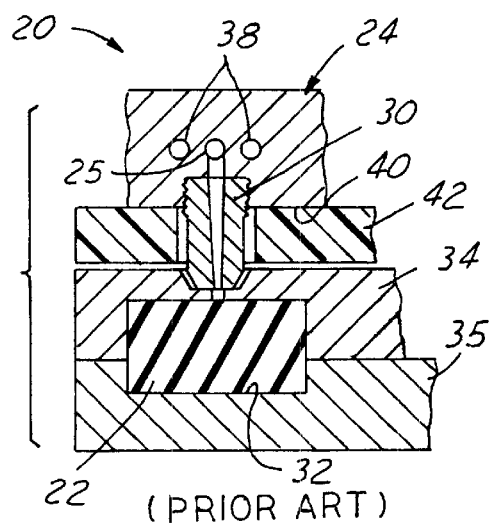
FIG. 4 is a fragmentary cross sectional view taken through one of the nozzles and mold cavities of the conventional prior art injection mold components comprising the manifold plate of FIGS. 1 and 2, the insulation plate of FIG. 3 and the upper and lower cavity plates or steels of the injection molding dies that define the mold cavities for making the injection molded parts.
Figure 4A:
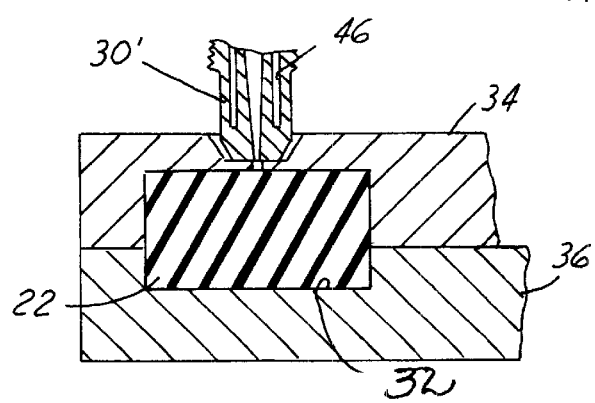
FIG. 4A is a fragmentary cross sectional view of a modified but conventional nozzle with water jacket cooling and shown in operative position relative to the upper and lower cavity plates of the mold assembly of FIG. 4
Figure 5A:
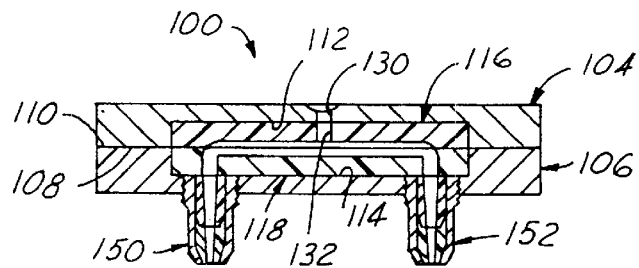
FIG. 5A is a cross sectional view taken on the line 5A—5A of FIG. 5B illustrating a first embodiment of a two-piece manifold plate and associated mold cavity injecting nozzle both constructed in accordance with features of the present invention.
Figure 5B:
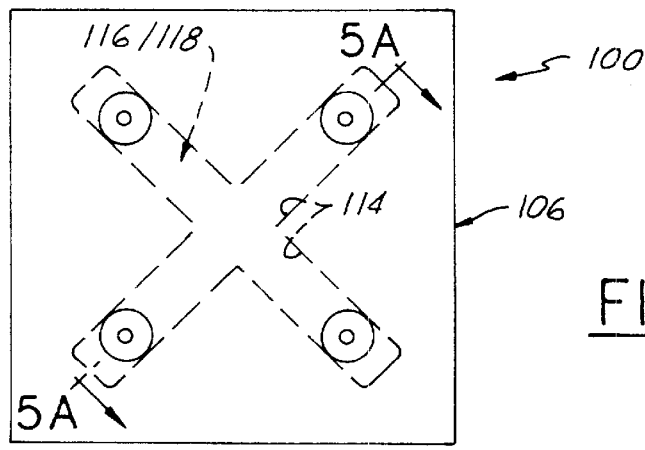
FIG. 5B is a bottom plan view of the manifold plate subassembly of FIG. 5A, but without the nozzles mounted thereto and with the polymer multiple-runner bar assembly shown in operatively sandwiched between the upper and lower manifold plates.
Figure 6A:
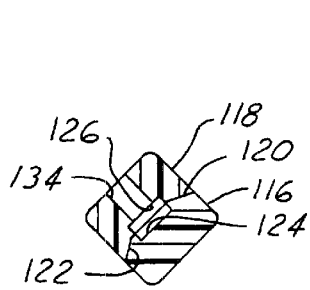
FIG. 6A is a cross sectional view taken on the line 6A—6A of FIG. 6B illustrating in cross section one leg of the cruciform subassembly of the upper and lower polymer bars employed in the manifold subassembly of FIGS. 5A and 5B.
Figure 6B:
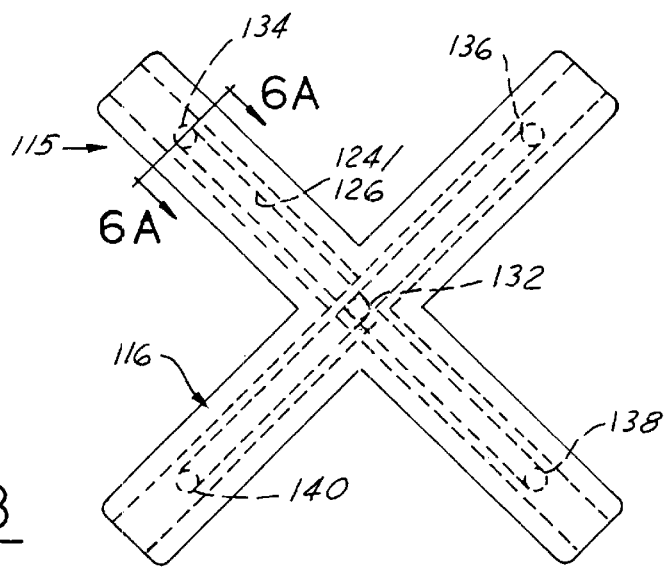
FIG. 6B is a top plan view of the cruciform polymer bar subassembly employed in the manifold subassembly of FIGS. 5A and 5B.

First Embodiment Manifold Plate Subassembly and First Embodiment Cavity Injections Nozzle FIGS. 5A, 5B, 6A, 6B and 7 illustrate a first embodiment manifold plate subassembly and associated mold cavity injection nozzle constructed in accordance with the present invention to provide a significant improvement in simplification, ease of construction, ease of cleaning and balanced molding pressure as it applies to the flow of uncured rubber through the two-piece manifold subassembly 100 into a multiplicity (four) of mold cavities. In this embodiment a two-piece split manifold plate set is provided consisting of an upper manifold plate 104 and a lower manifold plate 106, each preferably made of conventional mold tooling steel. The mating faces 108 and 110 of plates 104 and 106 are machined to form complementary and facing pockets 112 and 114 configured to closely receive a polymer runner bar subassembly having an "X" configuration in plan view as shown in FIG. 6B. The upper polymer bar 116 of the polymer bar subassembly 115 in plan view is thus identical to the lower polymer bar 118 (FIG. 6B). However, as seen in the transverse cross sectional view of FIG. 6A, the under face 120 of upper bar 116 is machined with a wedge-like configuration having a positive taper, whereas the upper face 122 of lower bar 118 is wedge shaped to have a negative taper. Upper bar 116 has a runner channel trench 124 milled into the apex of its positive taper surface 120, and likewise lower bar 118 has a runner trench 126 milled into the apex of its negative taper surface 122. In assembly of the upper and lower runner polymer bars 116 and 118, the milled trenches 124 and 126 register to form cylindrical cross section flow channels that serve as runners in manifold plate set. The contiguous faces 120, 122 of the bars 116 and 118 are designed with their mating positive and negative tapers machined in such a way so as to act as a high pressure gasket or seal when the upper and lower bars are compressed together under clamping pressure of the molds at the parting line of the manifold plate set. That is, these surfaces converge at a very slight angle toward their side surfaces. This high pressure gasket or seal action thus prevents the uncured rubber from leaving the confines of the runner flow channel formed by the registered channel trenches 124 and 126.

Figure 7:
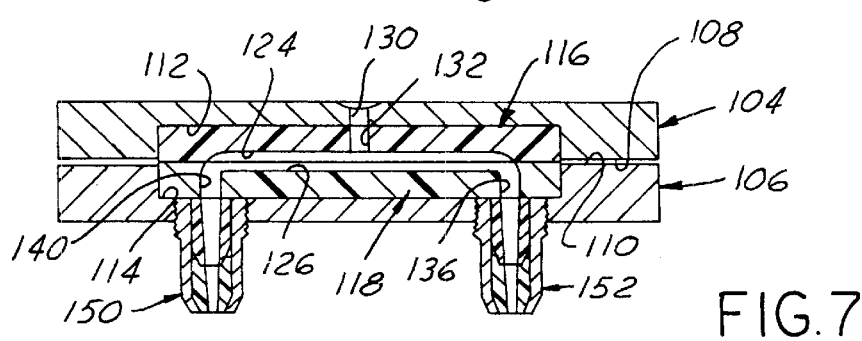
FIG. 7 is a view similar to FIG. 5A illustrating the design spacing between the upper and lower manifold plates when in initial assembly with the polymer bar subassembly and prior to application of mold clamping pressure, and thus compressive stress, to the assembly as occurs during mold clamp up prior to injection.

As illustrated in FIG. 7, bars 116 and 118 are dimensioned relative to their respective receiving pockets 112 and 114 in plates 104 and 106 so that when the bars are abutted with only light assembly pressure, i.e., loosely abutted, they protrude a slight distance from the faces 108 and 110 of plates 104 and 106 so that these faces are separated with a slight clearance labeled C in FIG. 7. This clearance insures a pre-load on bars 116 and 118 in the manifold plate set 104 and 106 when assembled into the injection mold tooling and clamping pressure is applied. The bars will then have sufficient pre-load applied to them so that a reliable seal occurs at the polymer bar contiguous faces 120 and 122 to insure that rubber flowing through the runner channels 124/126 does not leak or escape through the mating faces 120 and 122 of bars 116 and 118.

The inlet sprue for the first embodiment manifold set 116/118 is formed by a suitable centrally located opening 130 in upper manifold plate 104 (FIGS. 5A and 7). The upper polymer bar 116 is provided with a central sprue passage 132 designed to register with plate sprue inlet opening 130 and communicating with the upstream end of each of the four runners formed one in each of the four legs of the polymer bar subassembly 116/118. The downstream end of each of the four runners terminates in an associated outlet passage 134, 136, 138 and 140 respectively. These outlets are disposed proximate the free end of each of the legs and registering with an associated flow passage in each of the associated mold cavity injection nozzles threadably affixed in threaded sockets in the underside of lower plate 106 (FIGS. 5A and 7). Two of such nozzles 150 and 152 are shown in FIGS. 5A and 7 and they are constructed in accordance with further features of the invention as described in more detail hereinafter.

In accordance with another principle feature of the invention, the material of which the polymer bars 116 and 118 are constructed is a high temperature polymer material having low thermal conductivity, relatively high compressive strength and rigidity and relatively high wear resistance to the action of the molding material in liquid state flowing therethrough under pressure. Such high temperature polymer materials from which the runner bars 116 and 118 are machined from a starting blank of the same are preferably selected from the group comprising one or more of the following enumerated polymers:

(1) a polytetrafluoroethylene compound such as that produced by Dupont and sold under the trademark TEFLON (2) a polimide material such as that produced by Dupont and sold under the trademark VESPEL (3) an acetal compound such as that produced by Dupont and sold under the trademark DELRIN (4) an amorphous thermoplastic polyetherimide material such as that produced by General Electric and sold under the trademark ULTEM (5) a polyamide-imide material such as that produced by Amoco and sold under the trademark TORLON (6) polybenzamidazole material such as that produced by Hoechst and sold under the trademark CELAZOLE (7) a composite such as that produced through the chemical vapor in Miks et al U.S. Pat. No. 5,645,219 assigned on its face to Thiokol Corp. of Ogden, Utah and incorporated herein by reference in its entirety and sold under the trademark CARBON-CARBON COMPOSITE.

In general, the polymer or like material, such as one or more of the foregoing examples listed above, is selected such that the runner bars 116 and 118 will have sufficiently low thermal conductivity and sufficiently high structural integrity such that they can operate mechanically at the elevated operating temperatures of conventional plastic injection mold tooling. They also will provide sufficient thermal resistance to insure that the plastic molding material (e.g., rubber in the case of a thermoset plastic material) in residence in the manifold will not be subjected to heating or cooling to a level that will inappropriately alter the molding characteristics of such plastic molding material in a liquid of flowable state. In the case of a thermoset material such as rubber this means preventing the initiation of a pre-cure condition in the rubber, or in the case of a thermoplastic material, preventing initiation of solidification by cooling in such thermoplastic material while resident in a manifold flow channel.

As an alternative embodiment, the material of which the flow channels are constructed may consist of a laminate of two or more of the above identified materials, such as dual layer laminates of the aforementioned polymers enumerated as Nos. 1 and 2, 1 and 3, 1 and 4, 2 and 3, 2 and 4, 3 and 4, 1 and 5, 1 and 6, 2 and 5, 2 and 6, 3 and 5, 3 and 6, 4 and 5, and 4 and 6 or three layer laminates of any three of the aforementioned enumerated polymers such as 1, 2 and 3; 1, 2 and 4; 1, 3 and 4; 1, 2 and 5; 1, 2 and 6; 1, 3 and 5; 1, 3 and 6, etc. Such laminates may also use judicious selections from all the materials described above in various appropriate combinations in multilayered axially or radially arrayed laminates to fashion the runner bars as well as the nozzle assemblies, as will be well understood by those skilled in the art with the benefit of the present disclosure.

Second Embodiment Manifold Construction

Figure 8A:
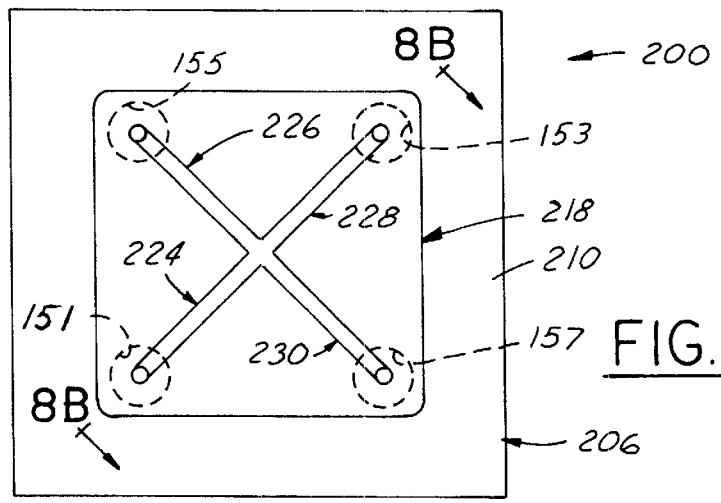
FIG. 8A is a plan view of a second embodiment manifold construction of the invention taken on the line 8A—8A of FIG. 8B.
Figure 8B:
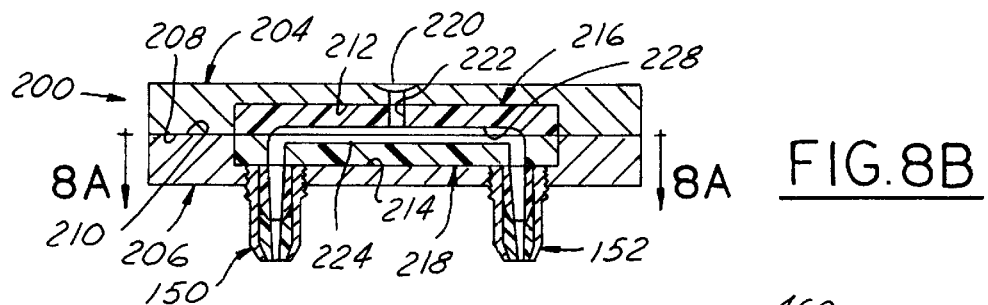
FIG. 8B is a cross sectional view taken on the line 8B—8B of FIG. 8A.

Referring to FIGS. 8A and 8B, a second embodiment of a manifold plate assembly 200 is illustrated wherein a two-piece manifold plate set is again made up of upper and lower manifold plates 204 and 206 made of suitable mold tooling steel or the like having high strength and high heat conductivity in accordance with conventional practice. Each of the plates 204 and 206 is provided in their contiguous mating faces 208 and 210 with a pocket 212 and 214 respectively of appropriate geometric outline, such as square as illustrated, to respectively closely receive a complementarily shaped upper and lower polymer plate 216 and 218. As in the first embodiment, the lower manifold plate 206 is provided with internally threaded through bores 151 and 153 to accommodate nozzles 150 and 152, and like internally threaded through bores 155 and 157 (FIG. 8A) to accommodate the additional two identical nozzles (not shown) of this four-cavity-mold injection manifold assembly 200.

The injection molding material flow channels that provide four runners emanating from the central plate sprue passage 220, and from the associated polymer plate sprue passage 222 registering therewith, are formed by milling two perpendicularly intersecting channel trench recesses in each of the square shaped polymer plates 216 and 218. When registered in assembly these trench channels form the four runners, indicated in phantom in FIG. 8A at 224, 226, 228 and 230, and leading to the flow channels in each of the associated nozzles threaded into pockets 151, 155, 153 and 157 respectively. Each of the polymer runner plates 216 and 218 may be constructed by machining or molding from a homogeneous mass of a single material of the type described previously, or may be constructed as a suitable laminate of two or more of such materials selected to best suit the functional parameter most needed in each laminar region of the plate, i.e., low thermal conductivity, wear resistance, compressive strength, structural integrity, economy of material, etc.

Third Embodiment Manifold Plate Construction

Figure 8C:
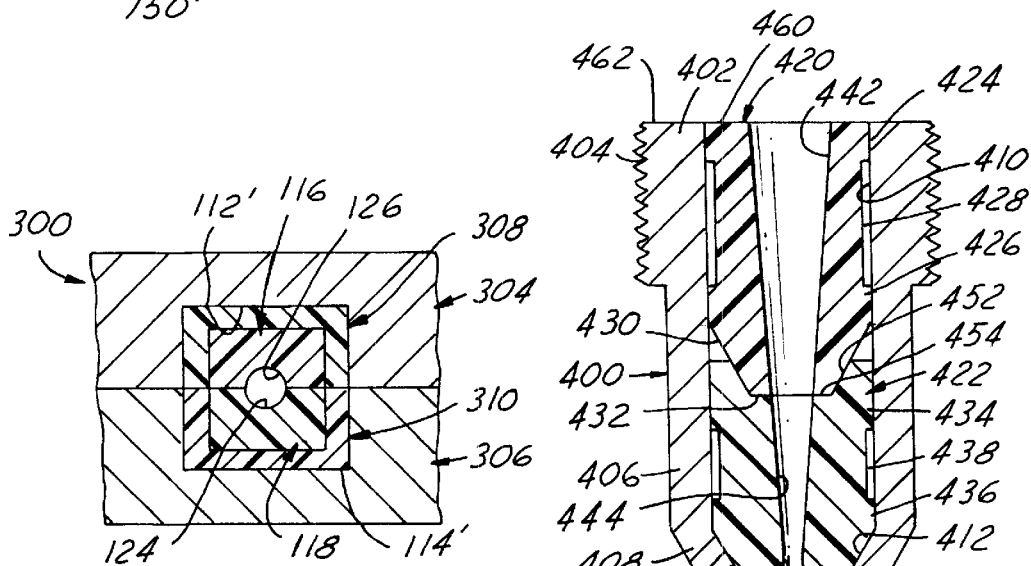
FIG. 8C is a fragmentary cross sectional view of a modified laminated construction of the polymer bar subassemblies of FIGS. 5A—6B in which the fluid conducting channel is defined by an inner high temperature polymer bar encased within and bonded to a composite material enveloping sheath.

FIG. 8C illustrates a further alternative runner flow channel manifold construction 300 in accordance with the invention. In this embodiment the two-piece steel manifold plate set 304/306 is made of upper and lower steel plates 304 and 306 similar to previously to previously described plates 104 and 106. The polymer-bar-receiving pockets 112' and 114' are suitably enlarged and deepened to accommodate a composite polymer runner bar subassembly made up of the previously described high temperature resistant, low thermal conductivity polymer bars 116 and 118, but with each respectively encased by an outside liner shell 308 and 310 respectively. The material of shells 308 and 310 may be a ceramic material, or any other material with high thermal resistance but with less wear resistance and lower in cost than the polymer material selected for construction of bars 116 and 118.

Injection manifold assembly constructions 100, 200, and 300 constructed in the manner indicated permit the highly heat conductive tool steel plates 104, 106; 204, 206; and 304, 306 to be suitably heated or cooled to effect heat transfer directly to the faces of the mold cavities 32 provided in the mold steels 34 and 36, while simultaneously thermally isolating the uncured plastic flowable molding material, e.g., rubber, in the runner flow channels to thereby enable the uncured rubber to flow into the mold cavities without curing the runner portion of such rubber molding material. The plastic molding material, such as rubber, in residence within the manifold assembly is then injected into the mold cavities 32 at the next injection cycle. This eliminates the need to cure the runnerresident material and then, wastefully, to scrap the solidified molded runner after each cycle. This also enables the molding cycle to be made to be of shorter duration while reducing the amount of scrap associated with each molding cycle by the amount of the volume of the molded solidified runners. Such a solidified (S/R) runner is illustrated in the separated mold set of FIG. 10, referred to in more detail hereinafter.

In all embodiments, the cross sectional thickness of the polymer material forming the walls of the runner flow channels in the manifold (and likewise in the nozzles 150, 152 as described hereinafter) are sized to provide the necessary heat transfer per unit of time sufficient to protect the uncured plastic molding material in its liquid state, whether it be thermosetting or thermoplastic material, from any in appropriate amounts of heat transfer to or from the material for a period of time at least equal to the time necessary to produce preferably three complete volume changes in the manifold and nozzle flow channels. The manifold and nozzle system of the invention thus can be used as a system or as individual components to improve fluid transfer in both thermoplastic and thermoset injection molding applications, as well as in other applications where manifolds are required to provide accurate distribution of pressurized fluids or semi-solids, and wherein heat transfer to or from the conducted fluid material is a consideration to be accounted for in the design of the system.

Detailed Description of Nozzle Embodiments of the Invention

Figure 9:
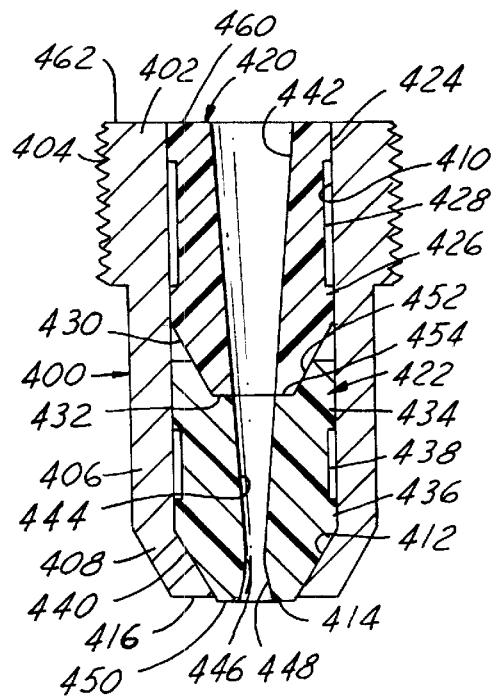
FIG. 9 is an axial center sectional view of the nozzle assembly embodiment of the invention illustrated in FIGS. 5A, 6 and 8B, shown by itself.

The manifold-to-mold cavity flow injection nozzles of the invention may constitute one or more of several embodiments, the first embodiment nozzles 150, 152 previously referenced generally being shown in more detail in FIG. 9. Nozzles 150, 152 each comprise an outer metal shell 400, machined from tool steel or other high strength metal alloy and having a diametrically enlarged head portion 402 provided with external threads 404 for threaded engagement with the internal threads provided in the individually associated nozzle pockets of the lower manifold plates of assemblies 100, 200 or 300. A cylindrical shank portion 406 of shell 400 terminates at its lower end integrally with a frustoconical nose portion 408. Shell 400 is hollow and formed with a constant diameter bore 410 open at the upper end of the shell and terminating at its lower end at the conical interior surface 412 of nose 408. Surface 412 has a circular opening 414 at its lower end as defined by the junction with the flat end face 416 of nose 408 which is designed to sealably seat on a corresponding flat surface provided in the upper cavity plate or steel 34 as shown in FIG., 4 as conventionally provided in the conventional mold tooling steel.

Nozzle 150 further includes upper and lower high temperature polymer spools 420 and 422 that are laminated axially, i.e., abutted axially end to end in assembly in nozzle 150 as shown in FIG. 9. Upper spool 420 has upper and lower external annular lands 424 and 426 each having an O.D. to closely fit the I.D. of bore 410. Lands 424 and 426 are axially spaced apart by a recessed cylindrical surface 428 that provides an air gap or air insulating annular space between the material of shell 400 and that of spool 420. This space, (as well as that surrounding the exposed area of surface 430) also provides an expansion chamber to accommodate differential thermal expansion of the polymer material of spool 420 relative to the steel material of shell 400. The lower end of upper spool 420 is formed with a frustoconical nose surface 430 that convergently tapers to a flat end face 432 oriented perpendicular to the longitudinal axis of spool 420.

Lower spool 422 likewise has upper and lower annular lands 434 and 436 each having an O.D. sized to closely fit the I.D. of bore 410, and again are separated by a cylindrical recessed surface 438 to provide another insulating air gap and another thermal expansion chamber, between the material of shell 400 and that of lower spool 422. The lower end of spool 422 also has a frustoconical nose surface 440 convergently tapered to sealably mate in abutment with shell interior nose surface 412 in assembly therewith.

Upper spool 420 has a central flow-through passageway 442 designed with a taper angle convergent in the flow-fill direction, i.e., toward the lower end of the spool 420, as shown in FIG. 9. Likewise, lower spool 422 has a flow-through passageway 444 having an inlet diameter at its upper end matching the outlet diameter of passage 442 in assembly, and tapering convergently in the flow-fill direction (toward the lower end of shell 422) to a minimum diameter at a constriction zone passageway 446 near the lower end of the spool. A reversely tapered passageway outlet portion 448 extends from constriction passageway 446 to a junction with the bottom flat face 450 of spool 422 and tapering divergently in the flow-fill (downward) direction.

Preferably the upper end of lower spool 422 is provided with a frustoconically shaped recessed surface 452 terminating at a flat seating surface 454 forming a margin of the inlet of passageway 444. In assembly the nose surfaces 430 and 432 of upper spool 420 seat in abutment against corresponding upper end surfaces 452 and 454 of lower spool 422. If desired, the upper and lower spools may be permanently affixed at these surfaces as by bonding adhesively, plastic welding or other suitable means of permanently attaching spools 420 and 422 in the axially laminated stack up illustrated in FIG. 9. When the spools are inserted in assembly within shell 400 without applied loading, the upper flat end surface 460 of upper spool 420 is designed to be flush with the upper end surface 462 of shell 400. However, the lower end face 450 of lower spool 422 is designed to protrude beyond flush with the plane of the lower end face 416 of shell 400. Hence, the spools are thus dimensionally sized relative to shell 400 such that when nozzle 150 is installed in the lower manifold plate 106 and the plate clamped in assembly with the mold steels and thus in operable assembly with the mold components, the protrusion causes sufficient mechanical pre-load to assure that the spools 420 and 422 are axially compressed. This also results in some radial expansion of the spools and assures that the plastic molding material, such as rubber, resident in the nozzle channel passageways 442, 444, 446 and 448 does not leak or escape from the flow channel of the nozzle or from joint junctions with those mold components in end abutment with the opposite ends of nozzle 150.

As in the case of the polymer bars 116 and 118 and the polymer plates 216 and 218, spools 420 and 422 are preferably constructed of a low thermal conductivity, non-metallic material with these physical characteristic parameters rated sufficient to enable the molding material resident in the nozzle flow-through passageway made up of passageways 442, 444, 446 and 448 to remain at a reasonable uncured molding temperature (in the case of thermoset material and rubber) for the duration of at least one or more injection cycles, and preferably at least three, due to the heat insulation characteristics of the nozzle. The resin resident in the flow-through nozzle passageway would then be injected into the associated part cavity 22 in the mold steels on the next injection cycle, thereby forming part of the molded part 32 and being replaced by fresh uncured resin from the injection ram of the plastic injection molding machine (not shown). This non-metallic polymer material of the nozzle spools 420 and 422 also must be selected to have mechanical properties to permit continuous acceptable usage as part of the manifold system within the mold in the molding environment. Preferably spools 420 and 422 are machined from starting blocks of homogeneous or laminated materials selected from the group set forth previously of the materials provided for selection and use in construction of the polymer bars 116, 118 and/or polymer plates 216, 218.

Although spools 420 and 422 may be combined and made as a one-piece part if desired, it is preferred to provide an axially laminated stack up of two or more spools 420, 422 in order to provide design flexibility. Again, if the spool is made as a one-piece polymer part, a suitable expansion chamber or annular space must be provided to accommodate differential thermal expansion relative to the metal shell. This enables the selecting of different materials to be used in each of the spools preferably of the aforementioned listed types of polymers, so that the physical characteristics of the materials selected best suit the heat transfer conditions extant in each axial increment of the nozzle shell 400 to thereby accomplish the aforementioned insulation of the plastic molding material, at the lowest possible cost of material consistent with this goal. Likewise, a spool or spools of nozzle 150 may alternatively be constructed as radially laminated cylinders constructed of concentric layers of selected polymer materials bonded to one another in an annular laminate construction. Again the same goal of optimizing choice of materials for their respective regional functions is observed, as well as the overall goal of optimizing thermal insulation of resident plastic molding material in its liquid state.

As another alternative, nozzle 150 may be made completely in one piece wherein shell 400 and spools 420 and 422 are integral and thus fashioned from one piece of the aforementioned polymer material having low thermal conductivity. Such an all-polymer one-piece nozzle construction may be homogeneous or may have a radially laminated construction as indicated above.

Figure 10:
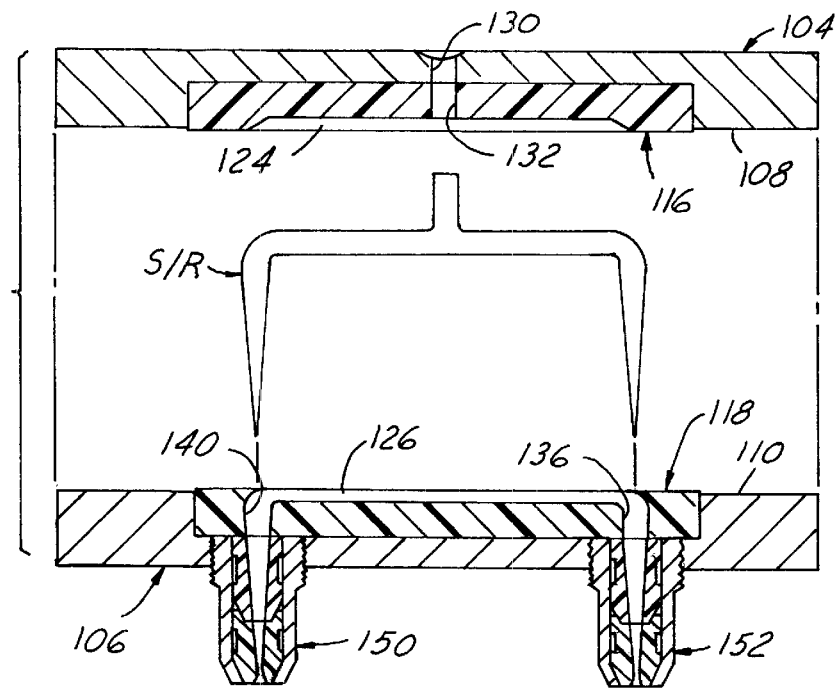
FIG. 10 is an exploded cross sectional view showing the opening of the two-piece manifold plate assembly of either FIGS. 5A or FIG. 8B and with the manifold assembly thus split apart, thereby exposing the polymer bar or plate runner channels and a cured rubber runner to illustrate what happens when the uncured rubber is left in residence in runner channels of the manifold plates for too long a period of time such that it becomes cured while resident therein.

Thus, in accordance with the invention, the cross sectional thickness of the walls of the plastic molding material flow channels in both the manifold and nozzle are sized to provide the necessary heat transfer per unit of time to protect the plastic molding material in its liquid state, e.g. uncured rubber, from inappropriate amounts of heat transfer to or from such material for a period of time equal to that necessary to produce preferably three complete volume changes in the manifold and nozzle channels. As illustrated in FIG. 10, if the liquid molding material, such as uncured rubber, is left in residence in the flow channels of the manifold nozzle for too long a period of time, it will become cured. When this occurs, and the manifold is split open as shown in FIG. 10, the upper and lower plates 104 and 106 are separated from one another and thereby expose the four runner channels 124 and 126 and the cured rubber runner S/R. The downstream-convergent flow channels in nozzles 150 and 152, i.e., flow-through passageways 442 and 444, have a relatively large draft angle to enable easy extraction of the completely cured rubber runner S/R from the nozzle passageways. Break-off normally occurs at the constriction region passageway 446 so that any cured material left in the divergent passageway outlet 448 either drops out or can be readily knocked out from the nozzle in accordance with conventional practice.

Second Embodiment Nozzle Construction

Figure 11A:
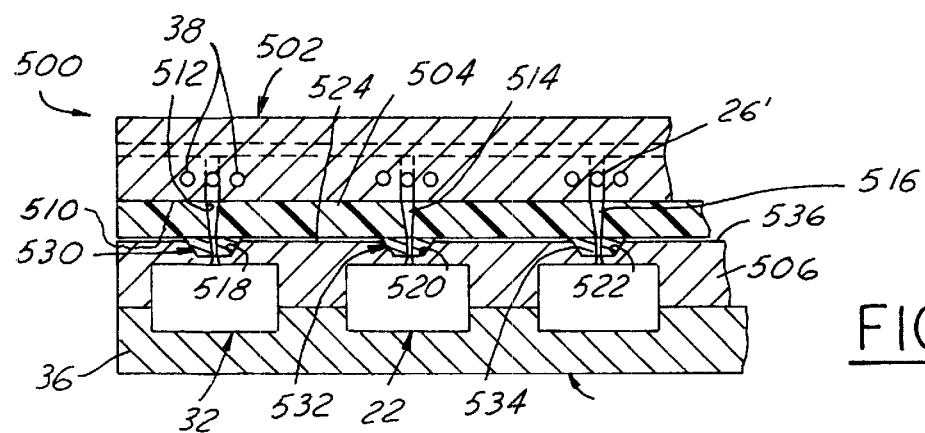
FIG. 11A is a fragmentary cross sectional view taken on the line 11A—11A of FIG. 11B illustrating a modified mold assembly employing a modified manifold plate, a combination multiple nozzle and insulation plate, a modified polymer nozzle insert for each of the mold cavities and a modified upper cavity plate cooperative with the polymer nozzle inserts and combination multiple nozzle and insulation plate.
Figure 11B:
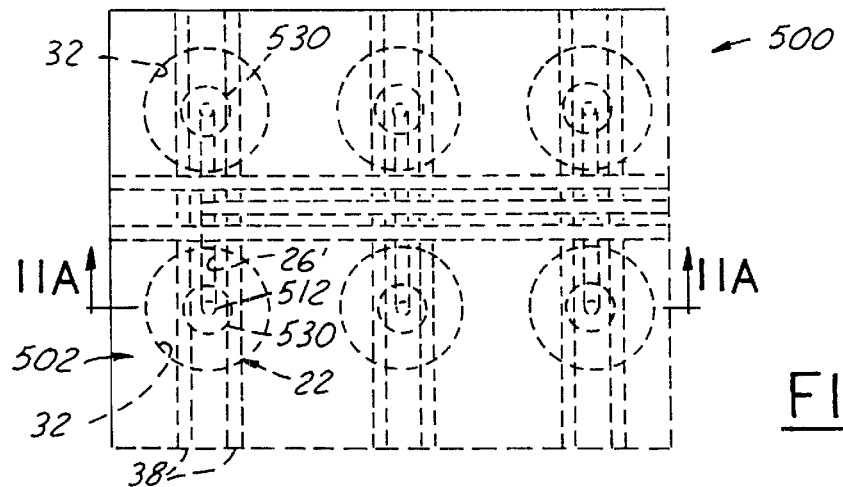
FIG. 11B is a top plan view of the modified mold assembly embodiment of FIG. 11A.

Referring to FIGS. 11A and 11B, a modified mold assembly 500 also is provided in accordance with the invention. Assembly 500 includes a modified steel manifold plate 502, a combined insulation and multiple nozzle plate 504, a modified upper cavity plate 506 and the previously described lower cavity plate 36. The manifold plate 502 is similar to conventional manifold plate 24 in having water cooling channels 38 (in the case of thermoset plastic molding material) and runner channels 26' drilled therein. However, the runner channels are provided with constant diameter outlets opening at the flat bottom face 510 of plate 502.

It is to be noted that the insulation plate 42 of the conventional prior art mold assembly described hereinabove in conjunction with FIGS. 1–4A is replaced by a combination insulation and multiple nozzle plate 504. Plate 504 is made of the low heat conductivity materials specified previously hereinabove for the heat insulating flow channels of the polymer bar and plate runners and nozzle spools. Plate 504 is provided with a plurality of machined flow channels 512, 514 and 516 each having an inlet diameter the same as that of the outlets of runners 26' and registering therewith. Each of these channels 512, 514 and 516 convergently tapers in flow-fill direction to an outlet that opens into an individually associated shallow circular recess 518, 520, 522 that is recessed into the flat lower face 524 of plate 504. Plate 504 is thus constructed to perform a dual function, namely, forming a portion of the cavity injected nozzle flow passageway and providing a heat insulation barrier between the mold steel plates 506 and 36 and the manifold plate 502.

The remaining part of the injection flow nozzle passageway is formed by a plurality of polymer nozzle inserts 530, 532, 534 (one for each of the mold cavities 32 of the mold assembly 500) and individually associated with plate flow channels 512, 514 and 516 respectively. The upper surface 536 of upper cavity plate 506 is provided with a frustoconical recess convergently tapering in the flow-fill (downwardly) direction and having a flow passageway outlet leading into the associated mold cavity 32. Each of the polymer nozzle inserts 530, 532, 534 may take the form as shown of a homogeneous solid frustoconical disk of circular configuration in plan view and having an O.D. at its upper end sized to fit snuggly into an associated recess 518, 520, 522 in the lower face 524 of plate 504. The frustoconical sidewall for each insert is designed to seat snuggly against the associated frustoconical sidewall of the associated pocket 536 recessed into the upper face 536 of plate 506. Each polymer nozzle insert 530, 532, 534 is provided with a flow through passageway extending axially and centrally thereof and configured in the manner of nozzle the passageways 442, 444, 446 and 448 of nozzle 150, albeit on an appropriate scale for the molding parameters of the assembly.

It thus will be seen that the polymer nozzle inserts 530, 532 and 534 are captured in associated pockets or recesses in the facing surfaces of the insulation plate 504 and upper cavity plate 506 when the mold is clamped in assembly. Again the inserts 530, 532 and 534 may be made of a homogeneous blank of material selected from the foregoing types of low heat conductivity polymer materials, and likewise as to the material of the combination plate 504, while observing the foregoing parameters of selection to best meet the goals of the invention stated previously. It will be seen that the nozzle construction provided by plate 504 and the simple geometry of nozzle inserts 530, 532 and 534 provide a very economical injection nozzle construction which also fulfills the aforestated objects of the invention. Again, both plate 504 and/or nozzle inserts 530, 532 and 534 may be of individual homogeneous construction of the selected polymer material or may be of axially and/or radially laminated construction as described previously. The axial dimension of the inserts is made sufficient so as to create in assembly a spacing between surface 536 of plate 506 and the under surface 524 of plate 504 as initially assembled without pre-load. Hence, when mold clamped, they are sufficiently compressed to yield and thereby bring these plate surfaces in flush contiguous contact under mold clamping pressure to thereby insure good sealing of the flow passageway through plate 504 and via the nozzle inserts into the mold cavities 32. The selected polymer material will have a slight resilience to accommodate this axial compression and resultant radial expansion to provide the sealing characteristics desired.

Although the nozzle inserts 530, 532 and 534 could be either permanently affixed to plate 504 or to plate 506, they need not be in view of the mechanical pre-load and sealing pressure engagement described previously. If not permanently affixed they are readily replaceable for repair or cleaning as needed or desired. Further economy is achieved by the plate 504 being made of the aforementioned selected low heat conductivity polymer material so it can serve the dual function of both heat insulation between plates 506 and 502 in the mold assembly as operably clamped and providing the heat insulated upper nozzle-like flow channels 512, 514 and 516 feeding the lower heat insulated flow nozzle inserts 530, 532 and 534 respectively.

Prior Art Gated Nozzle Valve Constructions

Figure 12:
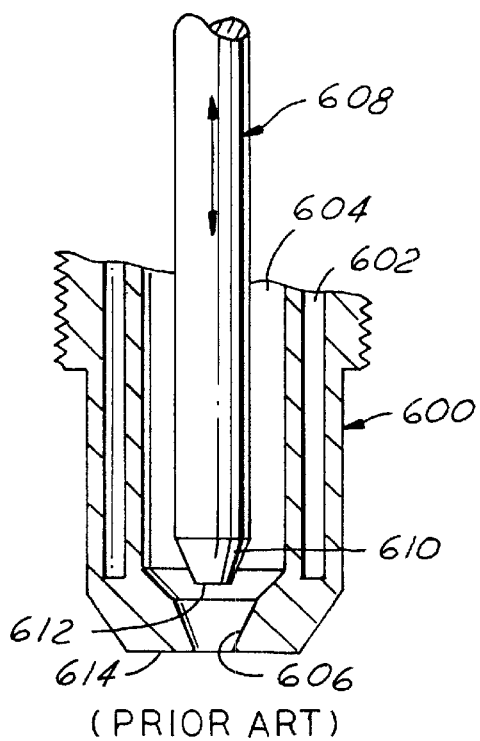
FIGS. 12 and 13 are fragmentary, part sectional, part elevational views of a prior art valve gate nozzle technology utilizing a valve stem moveable in the flow channel of the nozzle or bushing, FIGS. 12 and 13 illustrating the nozzle in open and closed conditions respectively.
Figure 13:
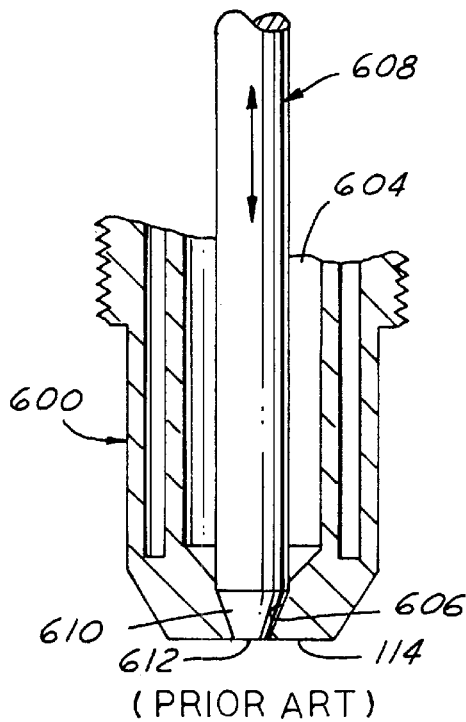
Figure 14:
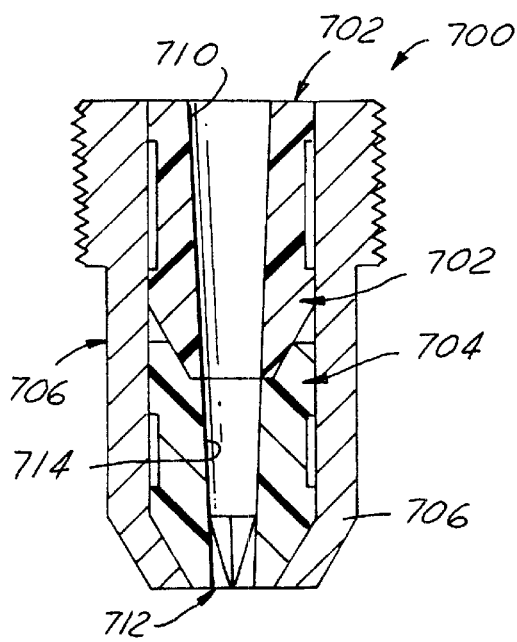
FIG. 14 is a center sectional view of a second embodiment mold cavity injection nozzle subassembly of the invention shown by itself and provided with a "duck bill" stemless shut off valve construction at its outlet.

Typical prior art gated nozzle valve constructions for plastic injection molding are shown in FIGS. 12 and 13. These may comprise a steel nozzle 600 with a cooling water (or heated oil) jacket channel 602 surrounding a flow-through passageway 604 having a frustoconical valve seat outlet surface 606 at the lower (downstream) nose end of the nozzle. An axially reciprocal valve stem 608 is movable in the center of the flow channel 604 and operates, when retracted, to exit the upstream orifice of the nozzle and enter the flow stream of the manifold runner system. The stem 608 at its free end has a nose 610 adapted to seat and seal against the tapered seat 606 of nozzle 600 in the closed condition of the valve. As shown in FIG. 13, nose 610 when so seated in fully closed position has its flat end face 612 flush with the flat end face 614 of nozzle 600 and provides a complete seal on the end of the nozzle (also termed "bushing"). This flush bushing or nozzle face insures that the molded part 32 formed in cavity 22 does not exhibit any significant vestige of a sprue on the cured part.

Typically valve stem 608 is stroked through the use of either a mechanical or hydraulic link provided in the injection molding system. Stem 608 is retracted during the fill or injection phase of the molding cycle, thereby opening the "gate," and is driven fully forward and sealed against a nozzle valve seat 606, closing the gate, during all other phases of the molding cycle.

Stemless Gated Valve Nozzle Embodiments of the Invention

Figure 15:
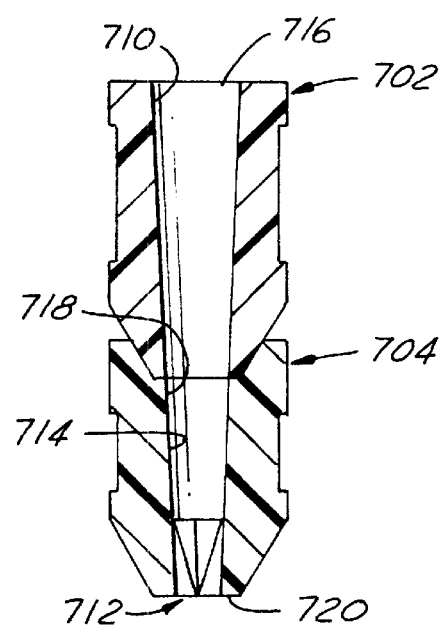
FIG. 15 is a center axial sectional view of the two interior polymer spools of the valve subassembly of FIG. 14 and shown without the encompassing steel shell.
Figure 16A:
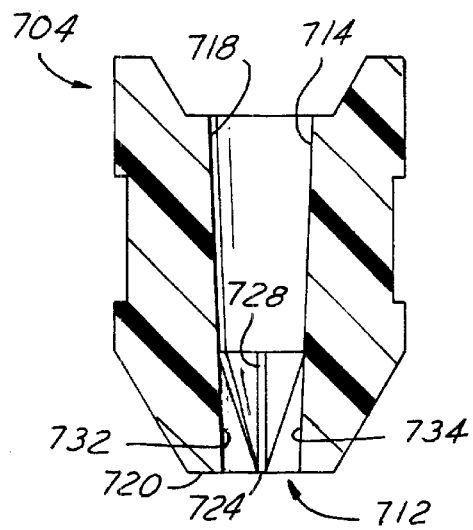
FIGS. 16A and 16B are cross sectional views taken on the lines 16A—16A and 16B—16B of FIG. 16C.
Figure 16B:
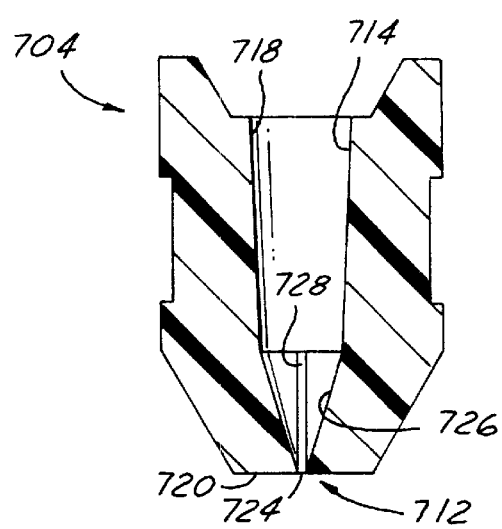
Figure 16C:
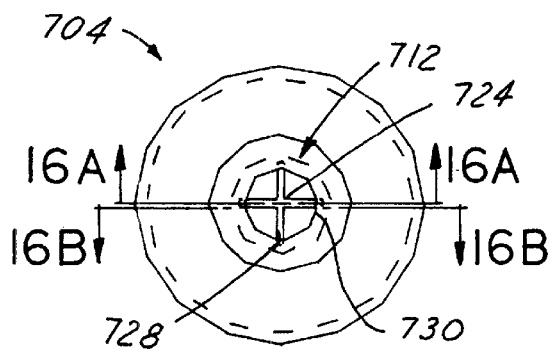
FIG. 16C is a bottom end view of the lower spool of the nozzle spool subassembly of FIG. 15 and shown by itself.
Figure 17:
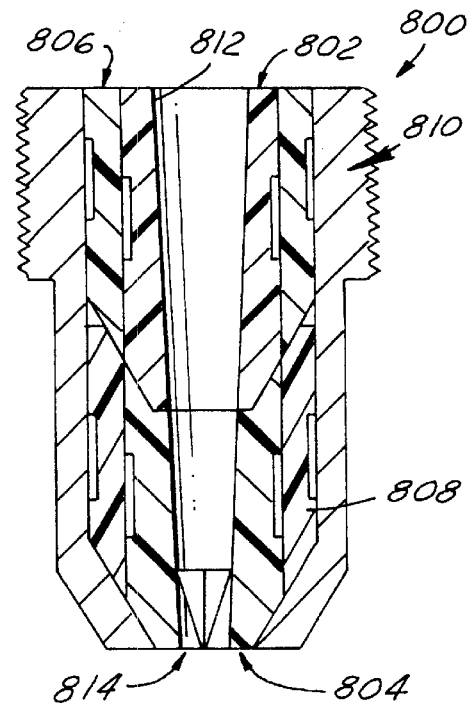
FIG. 17 is an axial center cross sectional view of a third embodiment of a mold cavity injection nozzle of the invention shown by itself.

In accordance with another embodiment of the present invention, the prior art valve stem gate manifold nozzle 600 described in conjunction with FIGS. 12 and 13 may be replaced by an improved nozzle construction in accordance with the present invention and illustrated by way of example in FIGS. 14, 15, 16A, 16B and 16C, or the modification thereof shown in FIG. 17. The nozzle construction 700 is shown by itself as a complete assembly in FIG. 14, the internal axially stacked upper and lower spools 702 and 704 of nozzle 700 are shown by themselves in FIG. 15, and the details of lower spool 704 of nozzle 700 are best seen in the views of lower spool 704 shown by itself in FIGS. 16A, 16B and 16C.

Nozzle 700 has an outer steel shell 706 (FIG. 14) identical to shell 400 of nozzle 150 and hence not described in detail. Likewise, the upper polymer spool 702 of nozzle 700 may be identical to spool 420 of nozzle 150 and hence not described further, except in terms of its internal flow-through passageway 710.

The lower spool 704 differs substantially from spool 422 of valve 150 in that it provides a stemless valve gate mechanism operable so that ram-generated fluid injection pressure will cause its downstream orifice to open for the duration of the injection or fill phase of the molding cycle. For this purpose a "duck bill" type automatic valve 712 is provided at the lower outlet end of the flow-through passageway 714 provided in lower spool 704. Likewise, the geometry of the flow-through passageways 710 and 714 respectively provided in the two spools 702 and 704 differs from that of nozzle 150. In place of the reverse taper of passageway 448 emanating from constriction passageway 446 in the flow-through passageway of nozzle 150 made up of passageways 442, 444, 446 and 448, the flow-through passageway 710, 714, as best seen in FIG. 15, is a direct pyramidal taper that begins at the upper inlet opening 716 of passageway 710 of upper spool 702, and the outlet end of the passageway 710 blends smoothly with the inlet end 718 of passageway 714 in lower spool 704. The passageway 714 continues the same taper angle convergent in the flow-fill direction and terminates at the face 720 of lower nozzle spool 704 where the duck bill nozzle construction is provided.

As best seen in FIGS. 16A, 16B and 16C, the duck bill nozzle valve construction 712 in the embodiment illustrated is an integral part of lower spool 704. The section line B—B of FIG. 16C is cut through the solid material of this nozzle valve, whereas the section line A—A in 16C is cut through one of the two gaps in this nozzle, thereby explaining the difference between FIGS. 16A and 16B. The nozzle valve orifice is in the form of a fine "X" pattern opening 724 as viewed in radial cross section (see FIG. 16C). Thus, as best seen in FIG. 16B, the lower end of passageway 714 terminates in a conical recess 726 that tapers convergently in the flow-fill direction, i.e., toward the outlet opening 724 in the flat end face 720 of lower spool 704.

The "X" pattern consists of two laser cut (or otherwise formed) cross slots 728 and 730 oriented perpendicular to one another and extending radially outwardly from the central axis of passageway 714. Slots 728 and 730 thus intersect at the center or on the axis of the nozzle and extend radially outwardly to a back wall line flush with an imaginary extension of the contiguous portion of the wall of passageway 714. Thus, as best seen in FIG. 16A, the cross slot 730 has such opposite back walls 732 and 734 coincident with the contiguous portion of wall 714. Slot 728 is likewise formed. As illustrated in FIGS. 16A, B and C the cross slots 728 and 730 have a width dimension when "closed" of the magnitude of 0.00001 inch, and are flex openable at their upstream and downstream ends and throughout their axial length. The material of nozzle spool 704 is one of those selected with the foregoing characteristics from the list provided, or their equivalent. Accordingly, the material in the nozzle outlet section 712 has a slight degree of resilience as compared to that of the material of the steel shell 706 to enable such yieldable valve opening and resilient closing "duck bill" action.

In operation, the stemless duck bill or flap valve gate mechanism of valve 700 operates in response to fluid injection pressure created by the injection ram (not shown) transmitted through the runner channels and injection manifold via the liquid plastic molding material contained therein, This pressure will cause the downstream orifice 712 to open for the duration of the injection or fill phase of the molding cycle. The open condition of this nozzle 712 is that illustrated in FIGS. 14–16C. The open orifice 712 will allow uncured plastic molding material, such as rubber, resident in the associated injection manifold to flow from the bushing or nozzle 700 into an associated mold cavity 32. When the injection or fill phase is completed, the molding machine ram operates to cause a cessation of injection pressure, that is preferably also augmented by a conventional pull back pressure reversal action to thereby create a slight negative fluid pressure, thereby allowing the "X" pattern orifice 724 to flex closed, thus stopping the flow of uncured rubber and allowing the rubber in the mold cavity 32 to cure.

Upon ejection from the opened mold, the cured part 22 will exhibit little or no sprue vestige because the stemless valve gate nozzle 700 is mounted such that it is seated on the immediate mold face and the closed orifice 728, 730 is flush with the outside face of the bushing or nozzle that is in contact with such molded parting face, Under this mode of operation, the "X" pattern cut forming the outlet nozzle section 712 and providing the outlet pattern opening 724 allows the polymer material of spool 704 to flex open to enlarge the width of valve slots 728 and 730 due to the pressure applied to the uncured or liquid state molding material, e.g., rubber, during the fill or injection phase of the molding cycle and exerted within passageway 714. Under this condition, the "X" pattern cut 724 opens sufficiently to provide the flow gap illustrated in FIG. 16A–16C through which uncured plastic injection molding material, such as uncured fluid rubber, will flow into the associated mold cavity 32.

At the completion of the fill or injection cycle phase of the molding injection system, the fluid pressure acting on the outlet flap valve construction 712 is removed, i.e., dropping the high positive pressure to zero, or even to a slight negative value, thereby permitting the natural elasticity of the polymer material of spool 704 to operably close the "X" pattern gap 724, thereby preventing flow of fluid or liquid molding material, such as uncured rubber, from continuing to exit from the passageway 714 and thus nozzle 700.

It is to be understood that the stemless type of flap valve gate of nozzle 700 can also be made in valve spools configured like spools 702 and 704 but formed from ferrous, non-ferrous, ceramic or composite alloys, either singly or in combination as a laminate as described hereinbefore, and to operably close, either due to resilience of the nozzle material and/or capillary resistance and in response to large fluid stream pressure variations. In other words, it is believed that the stemless valve gate nozzle 700 has novelty for use in conventional molding systems such as that described with reference to FIGS. 1–4A, as well as in the improved molding systems of FIGS. 5–11. Hence, the stemless valve gate nozzle 700 can be made in conventional materials as well as those of the invention, and can be utilized in various injection molding processes for thermoplastic and thermosetting resins as well as in various fluid handling processes where it is advantageous to transfer pressurized fluid in precision metered dosages.

Modified Stemless Valve Gate Nozzle Construction

FIG. 17 illustrates by way of example a "radially laminated" form of stemless valve gate construction in the form of a nozzle 800 containing interior upper and lower polymer spools 802 and 804 constructed identical to spools 702 and 704. These interior polymer spools 802 and 804 are closely surrounded by outer axially abutted upper and lower polymer spools 806 and 808 to provide a form of concentric heat insulating polymer radially and axially arrayed lamina in turn contained within the outer metal steel shell 810 of nozzle 800. Shell 810 can be constructed in the same manner as shell 706 of nozzle 700 and suitably sized to receive the interior radial and axial laminate array of interior and exterior polymer spools 802, 804, 806 and 808. This type of axially laminated and radially laminated polymer passageway construction, illustrated by way of example by spool 800, again offers a wide range of design flexibility in terms of material selection to best accommodate the heat transfer conditions within specific regions of the nozzle, and within the flow-through passageway 812 provided by the nozzle as controlled by the "duck bill" nozzle construction 814 (identical to the "duck bill" nozzle 712 of nozzle 700).

From the foregoing description, it will now be apparent to those skilled in the art that the invention in its various embodiments and variations disclosed and suggested hereinabove amply fulfills the expressly aforestated as well as other objects. The insulated runner and insulated nozzle system of the invention provides a significant improvement in terms of design simplification in the components of the mold tooling and manifold assembly, ease of construction of the same, ease of cleaning and better balanced molding pressure as it applies to the flow of the plastic molding material in liquid state through the manifold and into a multiplicity of cavities in the mold tooling. Repair and replacement of the runner channels now becomes feasible without replacing the encapsulating mold manifold and/or tooling plates. The problems of cured thermosetting material in the runner and nozzle system and the similar problem of cold solidification of portions of the thermoplastic material in such an alternative system are substantially overcome at less expense in terms of apparatus construction and operation. The improved manifold and nozzle constructions of the invention enables the designer to incorporate a variety of heat transfer insulation materials only at the points most needed and at minimal expense to thereby optimize performance and achieve the aforestated objects and improved results of the invention. The invention system also allows a good heat transfer path to continue to exist, if desired, through the mold assembly components to heat or cool the mold cavities in heat transfer bypass relation to the heat insulated plastic polymer material runner and nozzle flow-through channels.

Due to the high thermal resistivity of the nozzle materials of the improved nozzle constructions of the invention, they do not require the introduction of heating or cooling elements or passages, or cooling jackets, to offset the effects of contact with the part cavities in the mold. In addition, the nozzles, when using the carbon-carbon composite flow passages indicated previously, can be used to advantage in molding highly abrasive molding materials with high loadings of glass, carbon or mineral fibers or grains. Likewise, as to use of the heat insulating materials specified in the aforementioned Miks et al. U.S. Pat. No. 5,645,219 that are employed for novel use in the constructions of the present invention.

What is claimed is:

1. In an injection molding machine system having separable mold tooling including a manifold characterized by hot or cold runner operable for feeding liquefied plastic molding material via a manifold outlet nozzle or bushing to an injection gate of a mold tooling cavity, the improvement in combination therewith of means for maintaining the fluidity of the resident plastic molding material in said manifold and manifold outlet nozzle during closure of the injection gate, thereby enabling use of the resident material in the following molding cycle, said fluidity maintaining means comprising a flow path for the liquefied plastic molding material extending between a manifold inlet sprue, as fed by an associated injection machine ram of the system, and a mold cavity, as fed by said manifold outlet nozzle or bushing at the outlet of a runner of said manifold, said flow path being defined by a pre-formed mold component mounted in said mold tooling and containing a liquid-conducting conduit constructed and arranged for so conducting the liquefied plastic molding material and being constructed of high temperature resistant solid material in a conduit shape having self-supporting structural integrity, said conduit material comprising a non-metallic heat insulation material having a low thermal conductivity to thereby heat insulate the liquefied plastic molding material resident in the conduit flow path such that this resident plastic molding material remains at a reasonable uncured molding temperature for the duration of at least one injection cycle due to the heat insulation characteristics of said fluid flow conduit of the system.

2. The system of claim 1 wherein the heat insulation conduit material comprises a polymer material having mechanical properties adequate to permit continuous accessible usage as part of the manifold and nozzle within the mold tooling in the environment of the aforesaid injection molding machine.

3. The system as set forth in claim 2 wherein said manifold containing said flow path conduit includes a two-piece split manifold plate set comprising an upper manifold plate and a lower manifold plate having mutually facing pockets recessed into complementary mating faces of said plates, said pre-formed mold component comprising a polymer runner bar or plate subassembly including complementary upper and lower polymer bars or plates each having an exterior configuration for closely fitting within the pockets of the associated upper and lower plates, said bars or plates having mating facing surfaces with runner channel trenches formed into them and registering in assembly to define said conduit flow path and serving as runner means in said manifold plate set.

4. The system as set forth in claim 3 wherein said polymer bars or plates each comprise a plurality of legs radiating from a common center sprue area and having outlets of the runner channels trenches proximate the distal ends of said legs constructed and arranged for feeding to associated ones of a plurality of said mold cavities in said mold tooling, and wherein said mating facing surfaces of said upper and lower polymer bars each have a shallow V-shape in transverse cross section, one of said surfaces having a positive taper and the other a negative taper designed under squeeze pressure to form mutually engaged sealing surfaces for preventing leakage from said trench channels when mold tooling clamping pressure is applied for closing the mold tooling for molding operation and thereby squeezes together said upper and lower bars.

5. The system as set forth in claim 3 wherein said polymer bars or plates are dimensioned relative to their respective receiving pockets in said manifold plates such that when the bars or plates are abutted with only light assembly pressure they protrude a slight distance from the corresponding mating faces of said manifold plates so that these manifold plate faces are separated with a slight clearance by such abutment of the polymer bars or plates, the clearance generating protrusion dimension of the bars or plates being taken up by clamping pressure exerted on the mold to bring the manifold plate mating faces into contact, thereby compressing the polymer bars or plates with sufficient pre-load to insure a reliable seal at the polymer bar or plate contiguous mating faces and to thereby insure that the liquefied molding material flowing through the runner channels does not leak or escape through such polymer bar or plate mating faces.

6. The system as set forth in claim 2 wherein said conduit material comprises a high temperature polymer material having low thermal conductivity, relatively high compressive strength and rigidity and relatively high wear resistance to the action of molding material in liquid state flowing therethrough under mold injection pressure.

7. The system as set forth in claim 6 wherein said conduit material is selected from the group consisting of the following polymers:
   (a) a polytetrafluoroethylene compound
   (b) a polimide material
   (c) an acetal compound
   (d) an amorphous thermoplastic polyetherimide material
   (e) a polyamide-imide material
   (f) a polybenzamidazole material
   (g) a composite produced through the chemical vapor deposition or resin char process.

8. The system as set forth in claim 2 wherein said conduit material comprises a laminate of two or more of the following materials:
   (a) a polytetrafluoroethylene compound
   (b) a polimide material
   (c) an acetal compound
   (d) an amorphous thermoplastic polyetherimide material
   (e) a polyamide-imide material
   (f) a polybenzamidazole material
   (g) a composite produced through the chemical vapor deposition or resin char process.

9. The system as set forth in claim 2 wherein the cross sectional thickness of the polymer material forming the walls of the conduit runner flow channels is sized to limit the heat transfer per unit of time sufficient to protect the uncured plastic molding material in its liquid state, regardless of whether it be thermosetting or thermoplastic material, from any inappropriate amounts of heat transfer to or from the material for a period of time at least equal to the time necessary to produce about three complete volume changes in the manifold and nozzle flow path.

10. The system as set forth in claim 1 wherein said flow path conduit terminates in an outlet defined by said mold cavity injection nozzle, said nozzle comprising an outer metal shell made from tool steel or other high strength metal alloy and provided with means for removably attaching said nozzle to said manifold, said nozzle having a flow-through interior channel communicating at its inlet end with an outlet of an associated conduit flow path runner in said manifold and at its outlet end with a passage leading to an associated mold cavity in said mold tooling, said outer shell being hollow and formed with a constant diameter bore open at the upper end of the shell and terminating and opening at its lower end at a conical interior shell surface formed by a frustoconical nose section of said shell at the downstream end of said nozzle, said shell nose having a flat end face designed to sealably seat on a corresponding flat surface provided in the associated mold tooling, said nozzle further including high temperature resistant polymer spool means received with a close fit within the inner diameter of the bore of said shell and defining said flow-through passage of said nozzle, said spool being constructed of a high temperature polymer material having low thermal conductivity, relatively high compressive strength and rigidity and relatively high wear resistance to the action of molding material in liquid state flowing therethrough under mold injection pressure.

11. The system as set forth in claim 10 wherein said spool means of said nozzle comprises a plurality of axially end-abutted laminated spools each differing in material composition from the other, the material composition of each said spool being selected to best meet the heat insulation characteristics most needed in the region occupied by each such spool consistent with the least cost of material.

12. The system as set forth in claim 10 wherein said spool means of said nozzle comprises a plurality of axially end-abutted inner spools arrayed in an inner annular layer and a plurality of outer spools in axial end-abutment and arrayed as an outer spool layer concentric with said inner spool layer to thereby form an axial and radial laminate spool construction within said nozzle shell.

13. The system as set forth in claim 10 wherein the exterior side surface of said spool means has radially protruding lands engaging the interior surface of said shell to thereby define insulating air gaps in the annular space defined between the spool exterior side surface intermediate an adjacent pair of said lands and the juxtaposed interior surface of said shell.

14. The system as set forth in claim 10 wherein said spool means of said nozzle protrudes axially from at least one end of said shell under no-load nozzle assembly conditions such that, when said nozzle is installed in said manifold and said manifold is clamped in assembly with mold tooling and thus in operable assembly with the associated mold tooling components, said spool means protrusion causes sufficient mechanical pre-load to assure that said spool means is axially compressed, thereby causing some radial expansion of said spool means within said shell and thereby assuring that the liquified plastic molding material present in said flow-through passage of said nozzle spool means does not leak or escape from the nozzle conduit flow path or from joint junctions with those associated mold tooling components in end abutment with opposite ends of said nozzle.

15. The system as set forth in claim 1 wherein said manifold outlet nozzle is made completely in one piece to thereby provide a one-piece nozzle construction made entirely of said heat insulation material.

16. The system as set forth in claim 15 wherein said one-piece nozzle construction is made of homogeneous material throughout.

17. The system as set forth in claim 15 wherein said one-piece nozzle construction is in the form of a radially laminated construction.

18. The system as set forth in claim 1 wherein the cross sectional thickness of the walls of said flow path conduit in both said manifold and nozzle are sized to provide the necessary heat transfer per unit of time to protect the plastic molding material in its liquid state from inappropriate amounts of heat transfer to or from such material for a period of time equal to that necessary to produce at least about three complete volume changes in the manifold and nozzle conduit flow path.

19. The system as set forth in claim 1 wherein said mold tooling includes a combination insulation and multiple nozzle plate, a manifold plate containing runners and associated runner outlets disposed adjacent one side of said combination plate, and an upper cavity mold plate steel adjacent the opposite surface of said combination heat insulation and nozzle plate, said flow path conduit in said combination plate comprising tapered nozzle outlet passages individually operably associated with a plurality of mold cavities in said mold steel, and a plurality of mold nozzle inserts disposed between said combination plate and said upper cavity steel plate and individually registered with said combination plate nozzle outlet passages, said inserts defining a continuation of said flow conduit for conducting the liquid plastic molding material from said manifold plate runner outlets into said upper plate steel and hence into an associated mold cavity, said combination plate thereby performing a dual function of forming a portion of the cavity injection nozzle flow passageway system and providing a heat insulation barrier between the mold plate steel and the manifold plate.

20. The system as set forth in claim 19 wherein the material of said combination multiple nozzle and heat insulation plate and said nozzle inserts is a low heat conductivity polymer material selected from the group of following materials:

(a) a polytetrafluoroethylene compound
(b) a polimide material
(c) an acetal compound
(d) an amorphous thermoplastic polyetherimide material
(e) a polyamide-imide material
(f) a polybenzamidazole material
(g) a composite produced through the chemical vapor deposition or resin char process.

21. The system as set forth in claim 20 wherein said nozzle inserts are dimensionally sized so as to be squeezed between the juxtaposed faces of said combination plate and said upper cavity plate steel in mold assembly when mold operation clamping pressure is applied to the assembly to thereby insure good sealing of the flow passageway through the plate via said nozzles inserts into the associated mold cavities.

22. The system as set forth in claim 10 wherein said nozzle flow-through passageway has an inlet end at one axial end of said nozzle and an outlet end at the other axial end of said nozzle as defined by an always-open material flow-through passageway extending axially through the nozzle, said flow-through passageway having a tapering cross section largest at the inlet end and convergently tapering in the flow-fill direction to a minimum diameter constriction portion proximate the outlet end of said nozzle, said flow passageway having a divergent taper in the flow fill direction from said constriction to said outlet end.

23. The system as set forth in claim 1 wherein said nozzle comprises conduit means defining an axially extending central flow-through passageway having an outlet for allowing flow of liquefied plastic molding material into a mold cavity of a molding machine, an outlet flap valve located inside said nozzle at said nozzle passageway outlet in a conical outlet constriction of said flow-through passageway having a flow-fill-direction convergent taper at the flow outlet end of said nozzle, said flap valve comprising a semi-resilient material having at least one very narrow slot therein communicating at an upstream end with said flow passageway and at a downstream end with the exterior of said nozzle, said slot having a length dimension axially of said nozzle greater than its width dimension transverse to the longitudinal axis of said nozzle, said slot having a thickness dimension in a direction perpendicular to the imaginary plane defined by said length and width dimensions on the order of about 0.000010 inches, said slot being thickness enlargeable by the fluid pressure exerted by liquefied plastic injection molding material when present in the said nozzle flow passageway to thereby cause flow opening action in said flap valve in response to said fluid pressure rising to a given predetermined positive value, said flap valve being operably closed by reduction of said fluid pressure to a predetermined minimum positive value or to a negative value, wherein said slot in said flap valve is cut in an "X" pattern as viewed in a plane perpendicular to the longitudinal axis of said nozzle.

* * * * *